United States Patent [19]
Miller et al.

[11] 3,875,481
[45] Apr. 1, 1975

[54] CAPACITIVE WEIGHING MAT

[75] Inventors: Henry F. Miller, Clifton, N.J.; Jonathan Mishory, Birmingham, Mich.

[73] Assignee: Uniroyal, Inc., New York, N.Y.

[22] Filed: Oct. 10, 1973

[21] Appl. No.: 405,216

[52] U.S. Cl............... 317/246, 73/141 A, 177/210
[51] Int. Cl............................................ H01g 7/00
[58] Field of Search............... 317/246, 249 R, 261; 177/210; 73/141 A

[56] References Cited
UNITED STATES PATENTS
1,584,613   5/1926   Comstock .................... 317/246
3,565,195   2/1971   Miller ......................... 177/210
3,782,486   1/1974   Kuhn ........................... 317/246

*Primary Examiner*—E. A. Goldberg
*Attorney, Agent, or Firm* —Charles A. Blank, Esq.

[57] ABSTRACT

A weighing mat adapted to be loaded by a range of forces which preferably includes three elastomeric, conductive layers. The outer conductive layers are separated from the central conductive layer by two dielectric, elastomeric layers having ribs of trapezoidal cross section to form a capacitance which varies with compressive loading. The mat provides linear changes of capacitance with changes of compressive load, has increased load capacity, and has improved resistance to shear forces.

27 Claims, 12 Drawing Figures

CAPACITIVE WEIGHING MAT

BACKGROUND OF THE INVENTION

This invention relates to weighing mats, and, more particularly, to weighing mats of the type that utilizes the variation in electrical capacitance caused by the applied force of the load to be measured.

A weighing mat constructed in accordance with this invention is preferably a thin, flexible mat whose electrical capacitance varies in a linear manner with the magnitude of the force that is applied to it by the load to be measured. The weighing mat is preferably a capacitor of large dimension in which the plates comprise electrically conductive elastomeric layers separated by electrically non-conductive elastomeric layers. In the unloaded condition, the mat has an initial capacitance based on the electrical properties of the mat components. When a compressive load is applied to the mat, the components undergo a deformation which causes a change in capacitance which is related to the magnitude of the applied compressive load. This change in capacitance can be measured by suitable electronic means, for example, as described in U.S. Pat. No. 3,565,195.

The weighing mat of the preferred embodiment is formed as a sandwich of three electrically conductive layers separated by two elastomeric dielectric layers to create a two-section electrical capacitor. The dielectric layers, in turn, are composed of pluralities of spaced elastomeric separator elements either separate or joined, and the central conductive layer is also of a deformable elastomeric material.

The geometry of the transverse cross section in accordance with my invention preferably consists of a plurality of spaced, trapezoidal ribs separated by thin web areas. In order for the change in capacitance of the mat to vary linearly with the applied compressive load, the dielectric elements must be insensitive to shear loadings which would tend to bend these elements. If these shear loadings are high enough, the bending loads may cause the dielectric elements to collapse. This results in a non-linear response which is highly undesirable. The trapezoidal form of the dielectric elements provides a high resistance to shear loadings while maintaining the desired sensitivity to compressive loadings. The square cross-sectional shape of the dielectric ribs suggested by U.S. pat. No. 3,565,195 are subject to collapsing under both compression and shear loading.

It is an object of the present invention, therefore, to provide a new and improved weighing mat which avoids one or more disadvantages of prior such mats.

It is another object of the invention to provide a new and improved weighing mat which has increased load capacity.

It is another object of the invention to provide a new and improved weighing mat which has improved resistance to shear forces.

It is another object of the invention to provide a new and improved mat which provides an output capacitance change which varies linearly with the weight of the load applied to the mat.

In accordance with my invention, a weighing mat adapted to be loaded by a range of forces to be measured comprises at least two electrically conductive layers separated by a deformable dielectric layer. The deformable dielectric layer comprises projections individually having a cross-sectional shape having a first base near a first conductive layer and a second base near a second conductive layer, the first base being wider than the distance between the first and second bases.

For a better understanding of the present invention, together with other and further objects thereof, reference is made to the following description, taken in connection with the accompanying drawings, and its scope will be pointed out in the appended claims

DESCRIPTION OF THE DRAWINGS

Referring now to the drawings:

FIG. 3 is an enlarged fragmentary, sectional, perspective view of a dielectric layer of the FIG. 1 mat.

DESCRIPTION OF THE PREFERRED EMBODIMENT

Figure 1:
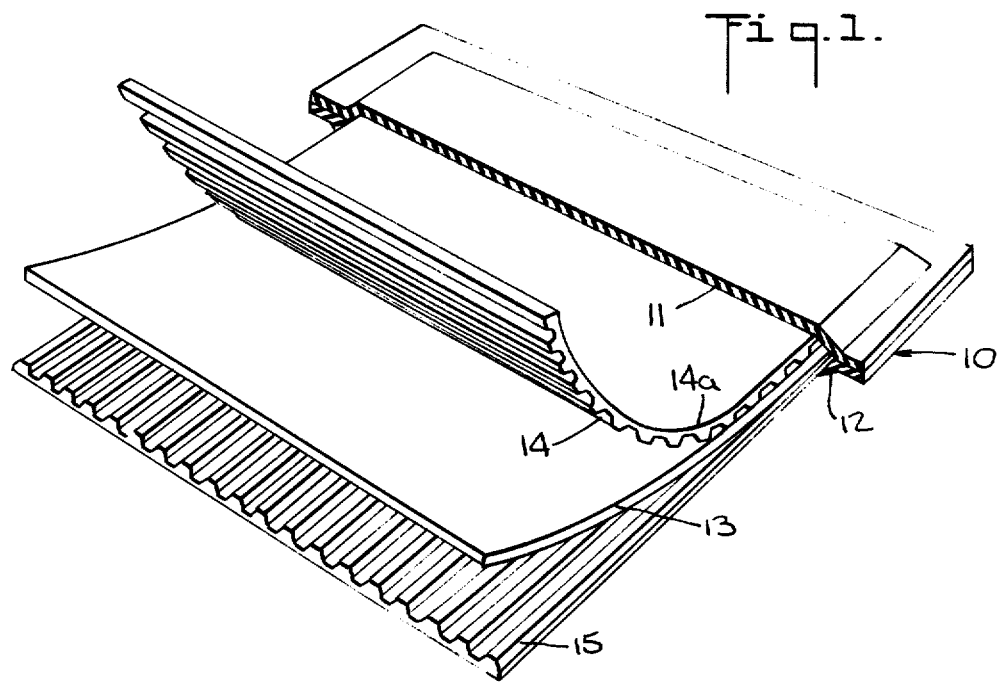
FIG. 1 is a schematic, fragmentary, perspective view of a weighing mat constructed in accordance with the invention with portions of the mat being broken away and portions being represented being separated to aid in viewing the construction of the mat.

Referring to FIG. 1 there is shown therein a preferred embodiment of a weighing mat 10 constructed in accordance with the teachings of the present invention. The composite mat 10 includes exterior, flexible, conductive elastomeric layers 11 and 12 and a centrally located, flexible, conductive elastomeric layer 13, separated by dielectric, elastomeric, compliant layers 14 and 15. Layers 11, 12 and 13 may comprise a compliant, conductive elastomeric material having a thickness of, for example, 0.070 inch made according to the procedure and recipe given below. The two dielectric layers 14 and 15 preferably comprise a plurality of equally spaced, parallel projections comprising ribs on webs bonded to the inner faces of the conductive layers 11 and 12 with the ribs bonded to the faces of the conductive layer 13. The ribs preferably are so oriented that the ribs of one layer lie at right angles to the ribs of the other layer. The ribs preferably are substantially trapezoidal in cross section and may be separated by a thin web 14a. The ribs may be made according to the procedure and recipe given below.

Figure 2:
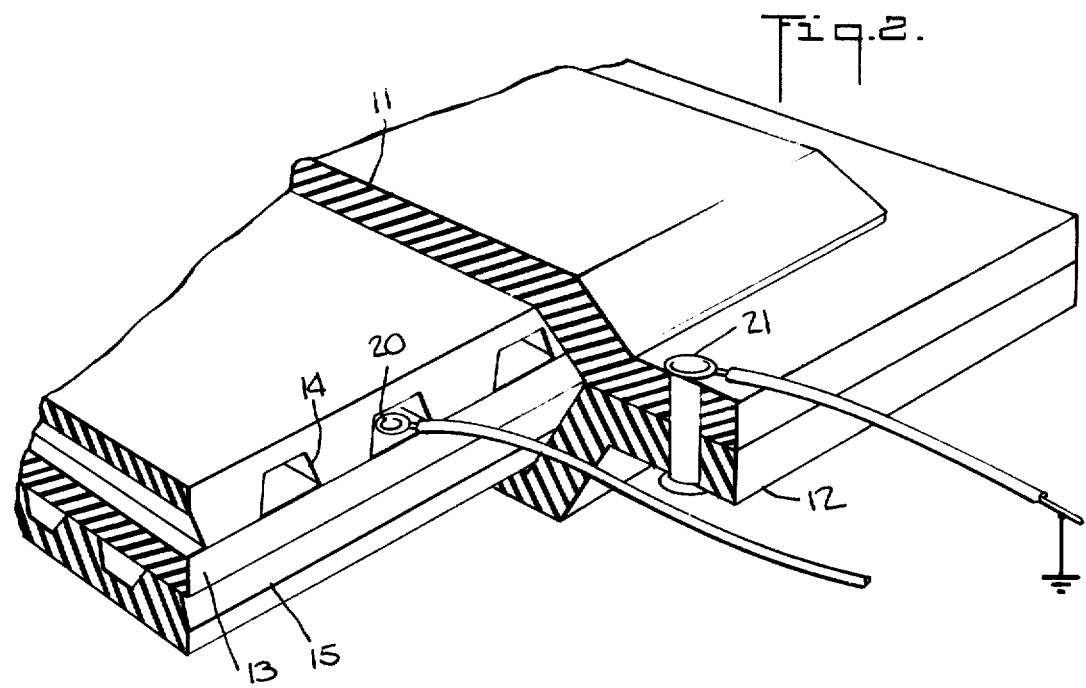
FIG. 2 is an enlarged, fragmentary, perspective view of the FIG. 1 mat showing the electrical connections to the separate layers of the mat.

As shown in FIG. 2, the exterior conductive layers 11 and 12 are provided with an electrical connecting terminal comprising, for example, a grommet 21, and the central layer 13 is also provided with an electrical connecting terminal 20. In operation, terminal 21 preferably connects together both outer conductive layers 11, 12 electrically as shown to form one of the plates of a variable capacitor which may be grounded and terminal 20 is utilized for connection to a suitable electronic circuit.

When the thin flexible mat 10 is loaded by a compressive force, a change in capacitance is effected due to the compressive deformation of the dielectric layers 14 and 15, which deformation alters the spacing of the conductive layers 11, 12 and 13. This change in capacitance is measured by suitable electronic means and may be displayed as either a change in capacitance in picofarads (pf) or as the magnitude of the compressive load in suitable units, for example, in pounds.

FIG. 3 is a fragmentary, cross-sectional and perspective view of the flexible, dielectric layer 14 made according to the teachings of this invention. As shown, neighboring ribs 30 and 32 of trapezoidal cross-sectional shape are spaced at a pitch P. The width of the first base of the trapezoid is designated W and the width of the opposite parallel face or second base is designated T. The height of the trapezoid is designated h. The web, 14a which connects neighboring ribs 30 and 32 has a width S and a thickness d.

The selection of the magnitudes of the parameters W, T, h, S and d, determines, in part, the load carrying capacity and sensitivity of the mat. In the present context, load carrying capacity is the largest compressive loading for which the change in capacitance as a function of compressive load is a linear function within preselected limits, for example, within five percent. For loadings in excess of this value, the change in capacitance with compressive load will become increasingly non-linear because of excessive deformations within the structure. Similarly, sensitivity in the present context is defined as the capacitance change per unit compressive load.

For satisfactory performance, I have determined that the geometry of the cross section of an individual dielectric layer should be within the following limits:

$$1 < W/h \leq 4 \qquad (1)$$

The ratio of the first base width of the trapezoid to the height, $W/h$, can vary from a value of about not more than 4 to a value approaching but not equal to 1. The value of 1 corresponds to a square cross section which would have relatively low resistance to shear loading. For values of $W/h$ greater than 4 the sensitivity of the mat is reduced beyond a practical minimum.

$$0 \leq S \leq W \qquad (2)$$

The distance between neighboring ribs can vary from zero or just touching at the base edges to a maximum distance which is equal to the first base width of the trapezoid. At distances S greater than the base width of the trapezoid, excessive deformations will be encountered in the rib structure which will result in non-linear relationship between change of picofarads and compressive load.

$$0 \leq d \leq h/2 \qquad (3)$$

The thickness of the web can vary from zero, that is, no web to a maximum value which is equal to one-half the height $h$ of the trapezoid. Thicknesses of the web greater than the above-stated maximum value cause the mat sensitivity to decrease below a practical minimum $$W/10 \leq T \leq W \qquad (4)$$

The top face or second base of the trapezoid can vary from one-tenth of the first base width to the first base width W, the latter condition yielding a dielectric layer with rectangularly shaped ribs. At values less than $W/10$ local deformations of the ribs occur which result in non-linear performance. Also, for values less than $W/10$ there results a marked reduction in the ability of the mat to withstand shear-type loadings.

The Geometry of the Dielectric Layer

A mat in accordance with the preferred embodiment of this invention was constructed. The geometry of the two dielectric layers of the preferred embodiment of this invention were $W = 0.139$ inch; $h = 0.050$ inch; $S = 0.066$ inch; $d = 0.012$ inch and $T = 0.1109$ inch. Substituting these dimensional valves into the criteria listed above gave the following values:

| | |
|---|---|
| $1 < 2.8 \leq 4$; | (1) |
| $0 \leq 0.066 \leq 0.139$; | (2) |
| $0 \leq 0.012 \leq 0.025$; and | (3) |
| $0.0139 \leq 0.1109 \leq 0.139$. | (4) |

It is apparent that the geometry of the dielectric layers fall within the limits set forth by the criteria listed above.

Fabrication of the Dielectric Layers

The dielectric layers were made from synthetic cis-1,4-polyisoprene elastomer compounded according to the following recipe:

| | Parts |
|---|---|
| (1) Natsyn 2200[1] | 100.0 |
| Protox 169[2] | 10.0 |
| Dixie Clay[3] | 3.0 |
| Sunpar 2280[4] | 3.0 |
| Neophax E[5] | 1.25 |
| Naugawhite Powder[6] | 0.75 |
| Lauric Acid | 3.0 |
| Tetramethyl thiuram Monosulfide | 0.3 |
| N-tert-butyl-2-benzothiazole sulfenamide | 1.0 |
| Sulfur | 2.5 |
| ML-4 at 212°F | 25. |

[1] Cis-1,4-polyisoprene elastomer from Goodyear Tire and Rubber Co.; sp. gr. = 0.91; ML-4 at 212°F. = 80-100.
[2] Zinc oxide from New Jersey Zinc Company; surface-treated with propionic acid; sp. gr. = 5.57; surface area = 10 sq. meters per gram.
[3] Kaolin hard clay from R. T. Vanderbilt Co., Inc. sp. gr. = 2.62 ± 0.03; fineness (325 mesh) 99.8%.
[4] Paraffinic oil from Sun Oil Co.; SUS viscosity at 100°F = 2907; sp. gr. = 0.8916; molecular weight = 720; flash point, COC = 595°F.
[5] Vulcanized vegetable oil from Stamford Rubber Supply Co.; sp. gr. = 1.05.
[6] Alkylated pisphenol from Uniroyal Chemical Co., sp. gr. = 0.96.

The dielectric layers were formed from the compounded elastomer in a transfer mold using a combination of conventional transfer and compression molding techniques. The molding conditions were 20 minutes at 300°F.

The physical and electrical properties of the cured stock were as follows:

| | | |
|---|---|---|
| Dielectric Constant | = | 2.5 |
| Tensile strength, psi | = | 2200 |
| Elongation, % | = | 470 |
| 300% Modulus, psi | = | 400 |
| Shore A Durometer | = | 42 |

Fabrication of the Conductive Layers

The conductive layers were made from natural cis-1,4-polyisoprene elastomer compounded according to the following recipe:

| | Parts |
|---|---|
| Smoked sheet No. 2 | 100.0 |
| Conductive Black[1] | 60.0 |
| HAF carbon black[2] | 12.0 |
| Circosol 4240[3] | 8.0 |
| Zinc Oxide | 5.0 |
| Stearic Acid | 3.0 |
| BLE-25[4] | 1.0 |
| Benzothiazyl disulfide | 0.65 |
| Di-O-tolylguanidine | 2.50 |

[1] XC-72, extra conductive furnace carbon black, from the Cabot Corporation; average particle size = 290 Angstrom units.
[2] High abrasion furnace reinforcing carbon black from the Cabot Corporation
[3] Naphthenic oil from Sun Oil Co.: SCS viscosity at 100°F = 2400; flash point COU = 130°F; molecular weight = 395.
[4] A high temperature reaction product of diphenyl-amine and acetone from Uniroyal Chemical; sp. gr. = 1.09.

The conductive layers were formed from the compounded elastomer in a compression mold. The inner conductive layer was calendered and steam cured as a flat sheet while the outer conductive layers were compression molded to a final dimension sufficient to overlap the internal layers by, for example, approximately one inch on edge. During the molding operation an open mesh flexible Monel metal fabric was incorporated into the two outer conductive layers to provide electrical shielding for the mat against external electric fields.

The physical and electrical properties of the cured stock were as follows:

| | | |
|---|---|---|
| Log Resistivity(*) | = | 1.56 ohm-cm |
| Shore A Durometer | = | 67 |
| Tensile, psi | = | 2250 |
| Elongation,% | = | 380 |
| 300% Modulus, psi | = | 2250 |

(*) ASTM D257-66

It should be noted that other materials can be used for the conductive and dielectric layers. It is desirable that the creep and hysteresis properties of the cured elastomeric components be a minimum.

Correspondingly, the conductive layers can be of other elastic materials such as metal, for example, alumimum, steel, copper and the like. The plate must be thick enough to behave elastically under the applied loads to prevent inelastic deformations which result in local deformations in rib structure other than that due to applied loading causing an erroneous output.

Final Assembly of Weighing Mat

The weighing mat was assembled and tested following the teachings of this invention. As indicated above, the weighing mat constructed had three conductive layers and two dielectric layers whose ribs were disposed at right angles to each other. It should be mentioned at this point that special care was observed in order to get proper adhesion between the neighboring layers. This was accomplished by washing the two sides of the dielectric layers with a suitable solvent such as Esso solvent No. 1 and dried until all solvent had evaporated while lying in the flat condition. Similarly, the contacting surfaces of the conductive layers were sandpapered, washed with Esso solvent No. 1 and allowed to dry while lying in the flat condition. Next, the two dielectric layers were trimmed to, for example, a 12 inch by 12 inch size and the center conductor was trimmed to, for example, a 11¼ inch by 11¼ inch size and fitted with a wire lead at the center of one edge using a standard grommet fitting. Both sides of the center conductive layer and the contacting surfaces of the outer conductive layers were brush coated with Chemlock 234 Adhesive and allowed to dry 24 hours at room temperature. Chemlock 234 is a heat sensitive adhesive for adhering cured rubber to cured rubber obtainable from Hughson Chemical Co., Division of Lord Corporation. The dielectric layers do not require any adhesive coating. The five layers were then assembled on a flat, ⅛ inch thick aluminum plate 15 inches square. This procedure provides a carrier plate and insures that there will be no relative motion between the assembled parts prior to final cure. The whole assembly was placed on the lower press platen of a conventional hydraulic molding press and covered with a 15 inch square, one inch thick sheet of flexible polyurethane foam. It is highly desirable that this foam be able to carry a compressive load of about 10 pounds per square inch without excessive deformation and also be capable of withstanding 290°F. while in the deformed position. A thermocouple lead was then placed between the foam sheet and the outer surface of the top conductive layer. The press was closed and a compressive load of 900 pounds was applied to the assembly. Heat was applied to the assembly from the lower press platen only. A total cure of 15 minutes at 290°F. was given to the assembly, the commencement of cure being taken as the time when the thermocouple indicated a reading of 290°F. In order to prevent entrapment of gases and to provide open vents for in-service conditions, the assembly was vented during the final curing step by means of two 0.050 inch conventional hypodermic needles which were located so as to maintain an escape channel to the outside atmosphere. After the cure cycle the whole assembly, including the aluminum carrier plate, was allowed to cool undisturbed to room temperature. After the assembly had cooled the Hypodermic needles were removed and the second electrical lead wire was attached to the edge of the two outer conducting layers using a grommet.

Performance of the Weighing Mat

Figure 4:
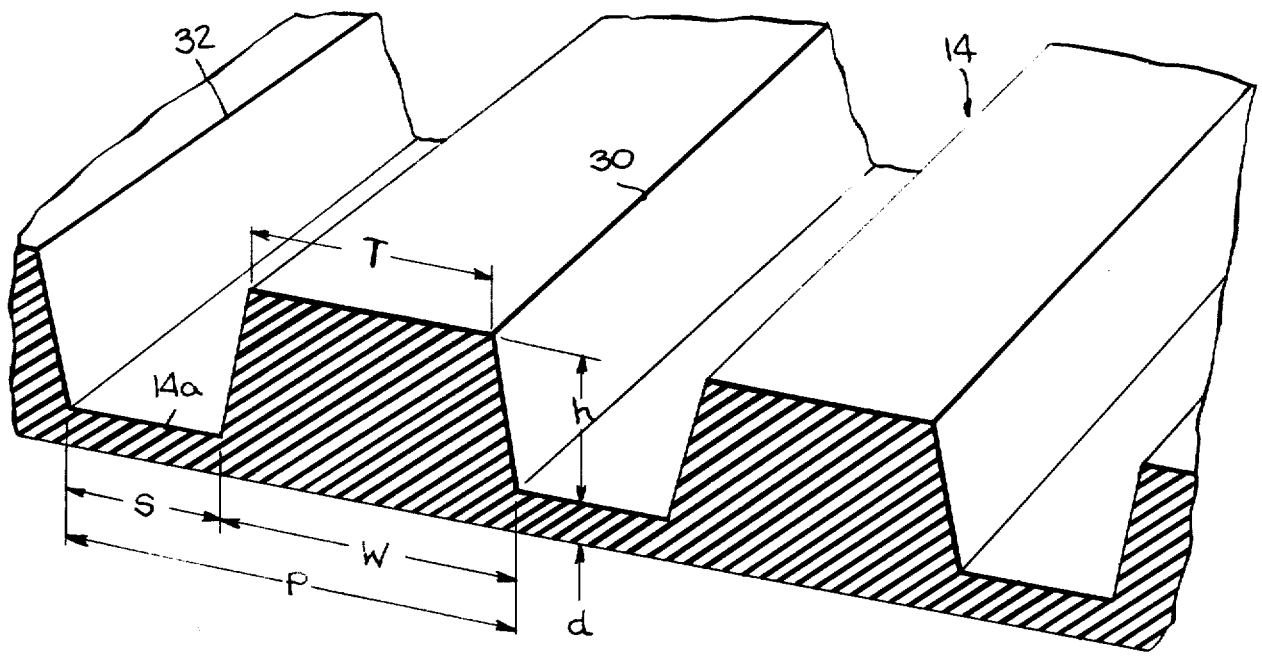
FIG. 4 is a graph of output signal, representing capacitance change from the capacitance of an unloaded mat, as a function of the applied compressive loading of a preferred embodiment of the mat.

The performance of the mat is shown in FIG. 4 which is the relationship of the change in capacitance (in picofarads) with change in compressive load. The change in capacitance was measured using the electronic circuitry and procedure described in U.S. Pat. No. 3,565,195. The relationship was linear within two percent over the range of loading applied over an area of 10 inches by 10 inches.

Figure 5:
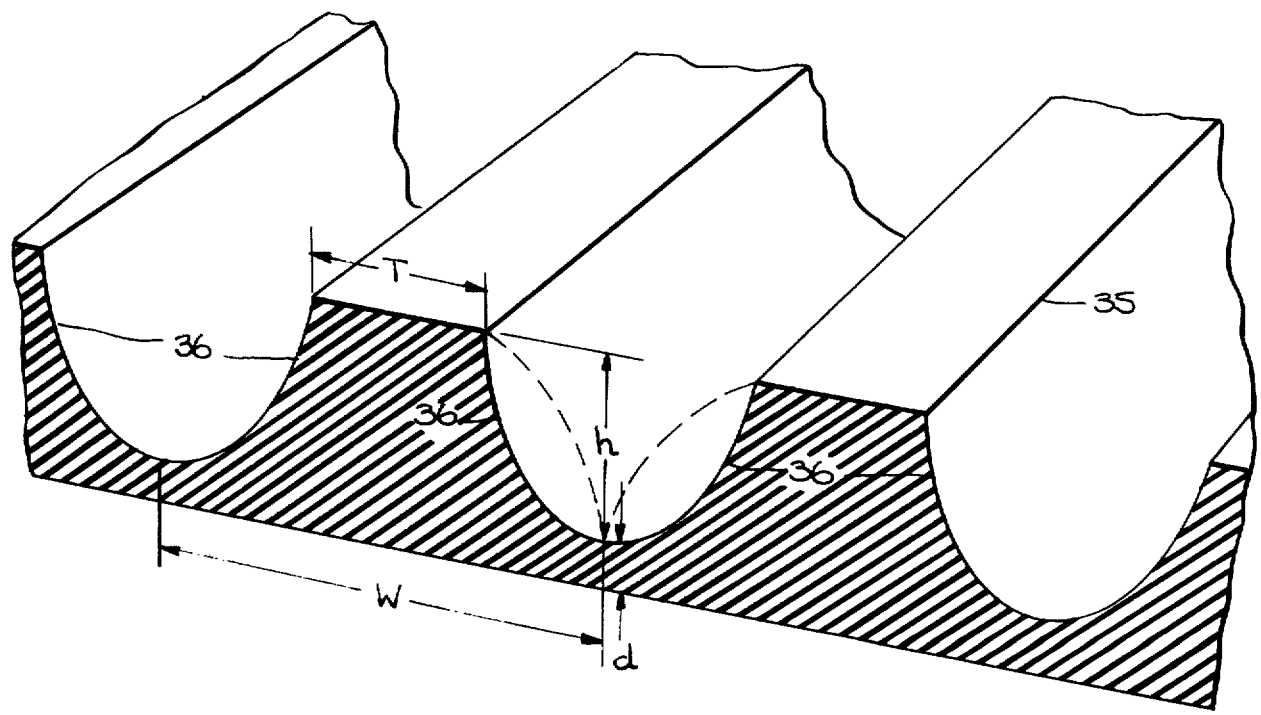
FIG. 5 is an enlarged, fragmentary, sectional, perspective view of a dielectric layer of a mat constructed in accordance with a modified form of the invention.
Figure 4:
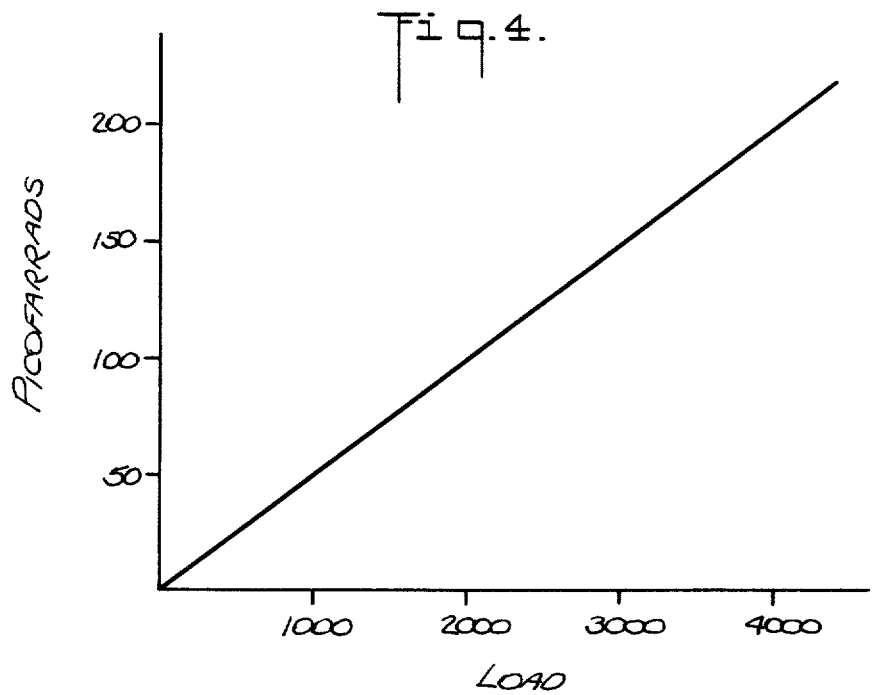

Referring now more particularly to FIG. 5 of the drawings, a dielectric layer 35 is represented in which the cross-sectional shapes of the projections or elongated ribs individually have curvilinear sides 36,36 between the first and second bases of the ribs. The curvilinear sides 36,36 may, for example, be of parabolic shape and form concave rib sides as represented in solid-line construction or may, for example, be of parabolic shape and form convex rib sides as represented in broken-line construction. Curvature of the sides of the ribs allows construction of a mat in which sensitivity can be altered to meet specific requirements which may be desired to be either linear or non-linear.for some applications. The parameters of the ribs preferably are proportioned in the manner described in connection with the FIG. 1 embodiment.

Figure 6A:
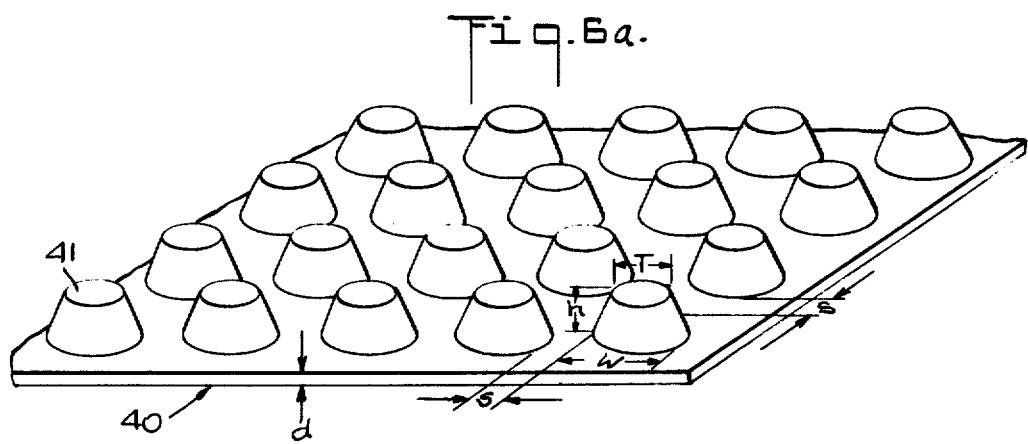
FIGS. 6a–6d are enlarged, fragmentary, perspective views of dielectric layers of mats constructed in accordance with modified forms of the invention.

Referring now more particularly to FIG. 6a, a dielectric layer 40 is represented in which the projections 41 individually have a substantially frustoconical shape. The cross sections of the projections 41 could also have curvilinear sides between the bottom and top bases, that is, the first and second bases, respectively. The parameters of the projections preferably are proportioned in a manner similar to that described in connection with the FIG. 1 embodiment but with the spacings S between adjacent projections in perpendicular directions being no greater than the width W of the first base of each projeaction. The projections of FIG. 6a are in a symmetrical pattern in both perpendicular directions of spacings between adjacent projections. It should be noted that the number of projections per unit area or density is a factor controlling the sensitivity of the weighing mat.

Figure 6B:
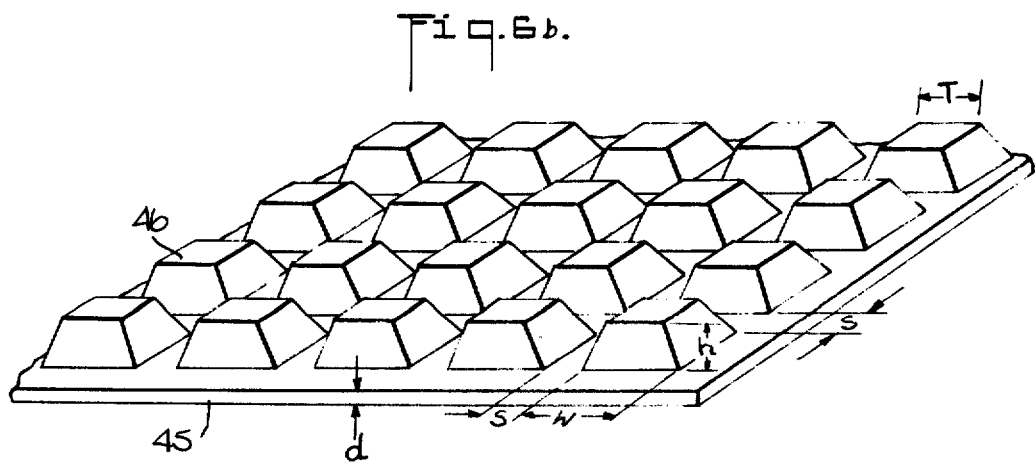

Referring now to FIG. 6b, a dielectric layer is represented in which the projections 46 individually have a frusto-pyramidal shape. The cross sections of the projections 46 could also have curvilinear sides between the bottom and top bases, that is, the first and second bases, respectively. The same criteria and principles mentioned above in connection with the FIG. 6a embodiment apply to the FIG. 6b embodiment.

Figure 6C:
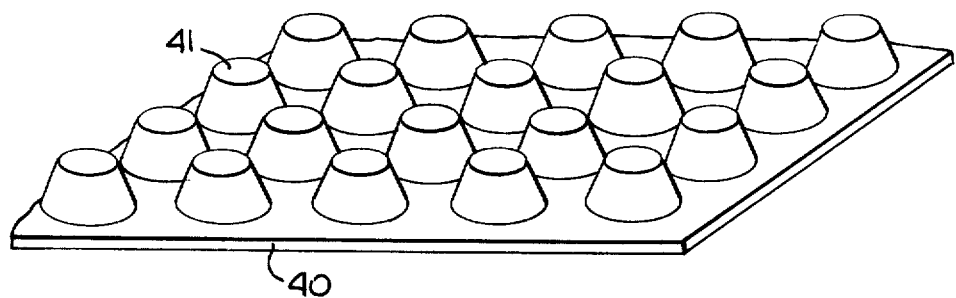
Figure 6D:
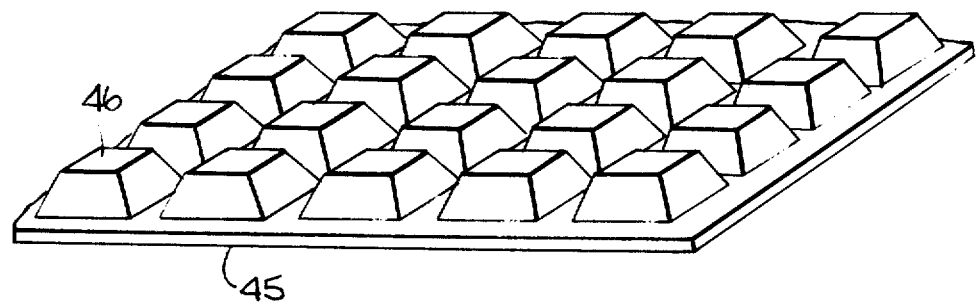

FIGS. 6c and 6d represent embodiments similar to the FIGS. 6a and 6b embodiments, respectively, but with the spacings between adjacent projections being different in perpendicular directions to provide greater shear resistance in one direction.

Figure 7:
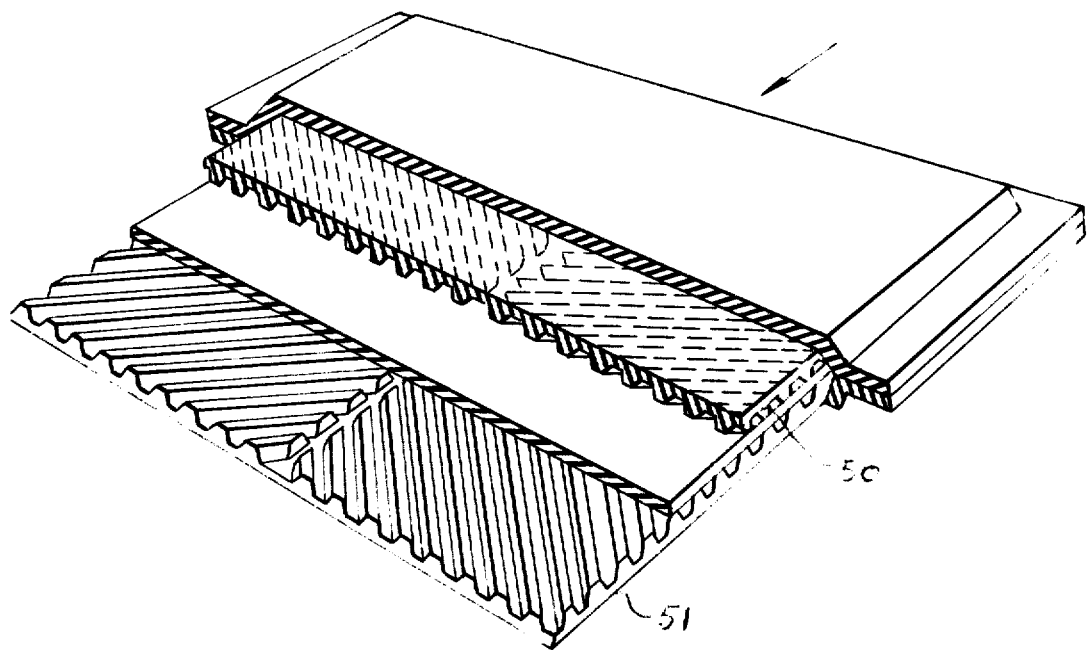

Referring now to FIG. 7, there is represented a weighing mat having a dielectric layer 50 with trapezoidal ribs in a herringbone pattern and a dielectric layer 51 with trapezoidal ribs in a herringbone pattern in the opposite direction. The ribs are disposed symmetrically and obliquely with respect to the outer perimeter of the mat and provide improved resistance to shear force, in the direction of the arrow, as compared with the FIG. 1 embodiment in which one dielectric layer of ribs provides less resistance to shear force normal to the perimeter of the mat. In the FIG. 7 embodiment, a stiff region along the apex of each herringbone pattern can be avoided by molding a small gap in the ribs at the apices.

Figure 8:
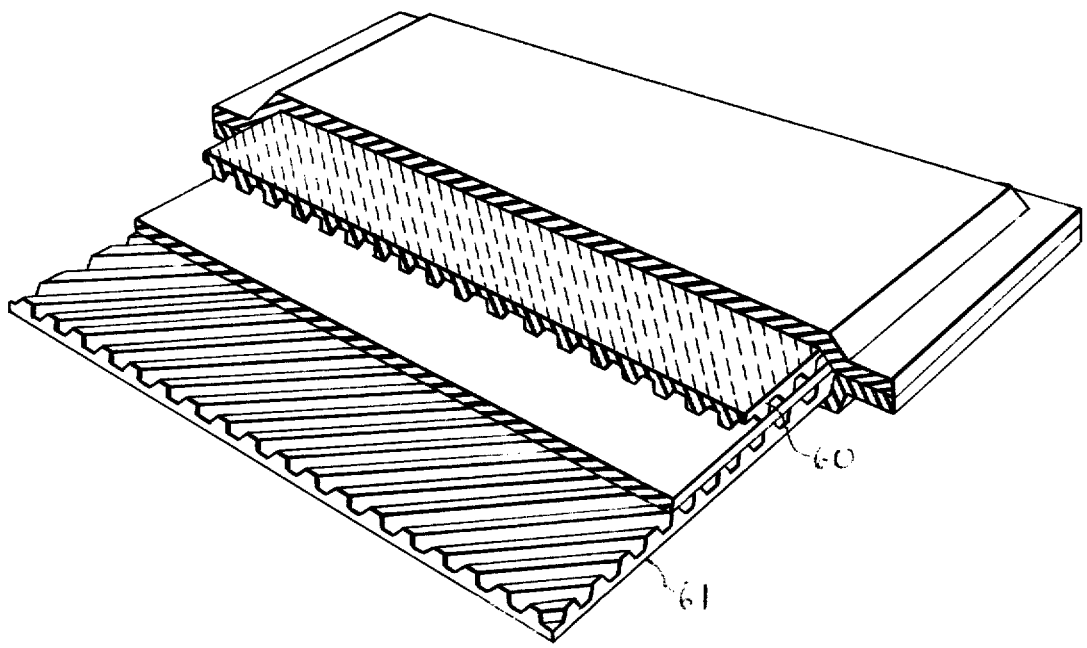

Referring now to FIG. 8, there is represented a weighing mat having a dielectric layer 60 with trapezoidal ribs disposed parallel to a diagonal of the mat and a dielectric layer 61 with trapezoidal ribs disposed parallel to the other diagonal of the mat. The ribs are disposed symmetrically and obliquely at, for example, 45° angles with respect to the outer perimeter of the mat and provide improved minimum resistance to shear force, in either direction normal to the mat, as compared with the FIG. 1 embodiment. While angles of 45° have been represented for the ribs of FIGS. 7 and 8, for some applications angles other than 45° may be desirable, for example, angles of 60° in both dielectric layers with respect to the direction of the applied shear force. Whatever angle is selected, the disposition of the ribs should be symmetrically located about the direction of the applied shear force.

Figure 9:
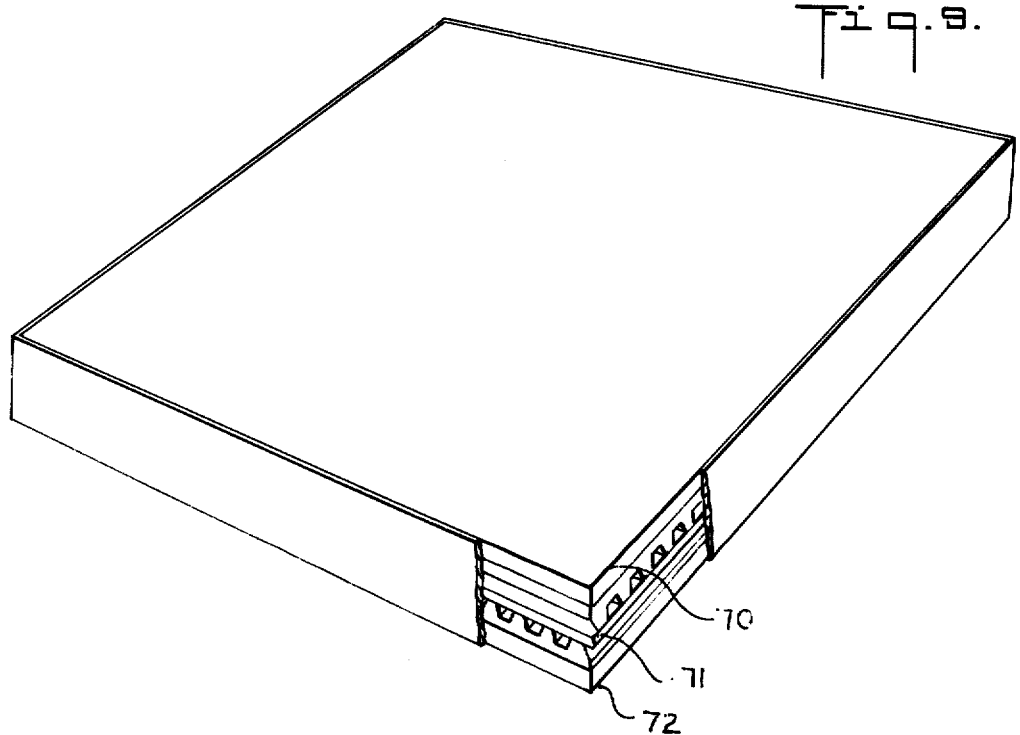
FIGS. 7–9 are fragmentary, perspective views of mats constructed in accordance with modified forms of the invention.

Referring now to FIG. 9, there is represented a weighing mat similar to the FIG. 1 mat but with conductive layers 70, 71, 72 being of elastic materials such as metals, for example, aluminum, steel, copper and the like, the behavior of which has been described previously herein. A suitable pressure-sensitive tape may be used to seal the edges of the mat, as may also be used in the other embodiments, if desired.

While there has been described what is at present believed to be the preferred embodiment of this invention, it will be obvious to those skilled in the art that various changes and modifications may be made herein without departing from the invention, and it is, therefore, aimed to cover all such changes and modifications as within the true spirit and scope of the invention.

I claim:

1. A weighing mat adapted to be loaded by a range of forces to be measured comprising:
at least two electrically conductive layers separated by a deformable dielectric layer, said deformable dielectric layer comprising projections individually having a cross-sectional shape having a first base near a first conductive layer and a second base near a second conductive layer, said first base being wider than the distance between said first and second bases and said projections individually having a substantially trapezoidal cross-sectional shape.

2. A weighing mat in accordance with claim 1 in which said second base is no wider than said first base and is no less than one-tenth as wide as said first base.

3. A weighing mat in accordance with claim 1 in which the distance between adjacent projections is no greater than the width of said first base.

4. A weighing mat in accordance with claim 1 in which said dielectric layer includes a web integral with said projections and in which the thickness of said web is no greater than one-half the distance between said first and second bases.

5. A weighing mat in accordance with claim 1 in which said conductive and dielectric layers comprise elastomeric materials.

6. A weighing mat in accordance with claim 1 which includes three electrically conductive layers comprising two outer layers and a central layer and which includes two deformable dielectric layers comprising projections of similar cross-sectional shape, with individual ones of said dielectric layers positioned between said outer conductive layers and said central conductive layer and separating said outer conductive layers from said central conductive layer.

7. A weighing mat adapted to be loaded by a range of forces to be measured comprising:
at least two electrically conductive layers separated by a deformable dielectric layer, said deformable dielectric layer comprising projections individually having a cross-sectional shape having a first base near a first conductive layer and a second base near a second conductive layer, said first base being wider than the distance between said first and second bases and the cross-sectional shapes of said projections individually having curvilinear sides between said first and second bases.

8. A weighing mat in accordance with claim 7 in which said projections are elongated ribs.

9. A weighing mat in accordance with claim 1 in which said projections individually have a substantially frusto- conical shape.

10. A weighing mat in accordance with claim 9 in which the spacings between adjacent projections in perpendicular directions is no greater than the width of said first base.

11. A weighing mat in accordance with claim 1 in which said projections individually have a substantially frusto-pyramidal shape.

12. A mat in accordance with claim 11 in which the spacings between adjacent projections in perpendicular directions is no greater than the width of said first base.

13. A weighing mat in accordance with claim 1 in which said conductive layers comprise elastic material and said dielectric layers comprise elastomeric material.

14. A weighing mat adapted to be loaded by a range of forces to be measured comprising:
at least two electrically conductive layers separated by a deformable dielectric layer, said deformable dielectric layer comprising elongated ribs individually having a cross-sectional shape having a first base near a first conductive layer and a second base near a second conductive layer, said first base being wider than the distance between said first and second bases and said elongated ribs individually having a substantially trapezoidal cross-sectional shape.

15. A weighing mat in accordance with claim 14 in which said second base is no wider than said first base and is no less than one-tenth as wide as said first base.

16. A weighing mat in accordance with claim 14 in which the distance between adjacent ribs is no greater than the width of said first base.

17. A weighing mat in accordance with claim 14 in which said dielectric layer includes a web integral with said ribs and in which the thickness of said web is no greater than one-half the distance between said first and second bases.

18. A weighing mat in accordance with claim 14 in which said conductive and dielectric layers comprise elastomeric materials.

19. A weighing mat in accordance with claim 14 which includes three electrically conductive layers comprising two outer layers and a central layer and which includes two deformable dielectric layers comprising elongated ribs of similar cross-sectional shape, with individual ones of said dielectric layers positioned between said outer conductive layers and said central conductive layer and separating said outer conductive layers from said central conductive layer.

20. A mat in accordance with claim 19 in which said ribs of one dielectric layer are substantially parallel to each other and said ribs of the other dielectric layer are substantially parallel to each other and said dielectric layers are so positioned with respect to each other than said ribs of said one dielectric layer are substantially normal to said ribs of said other dielectric layer.

21. A weighing mat adapted to be loaded by a range of forces to be measured comprising:
three electrically conductive layers comprising elastomeric material and comprising the two outer layers and a central layer;
two dielectric layers comprising elastomeric material and comprising spaced elongated ribs of similar substantially trapezoidal cross-sectional shape with individual ones of said dielectric layers positioned between said outer conductive layers and said central conductive layer and separating said outer conductive layers from said central conductive layer, said cross-sectional shape of said ribs having a first rib base near one of said one of conductive layers and a second rib base near another of said conductive layers, said first rib base being wider than the distance between said first and second rib bases, said second rib base being no wider than said first rib base and no less than one-tenth as wide as said first rib base, the distance between adjacent ribs of each dielectric layer being no greater than the width of said first rib base.

22. A weighing mat in accordance with claim 21 in which each of said dielectric layers includes a weeb integral with said ribs of each dielectric layer and in which the thickness of each web is no greater than one-half the distance between said first and second rib bases.

23. A weighing mat in accordance with claim 14 in which said ribs are disposed symmetrically and obliquely with respect to the outer perimeter of said mat.

24. A weighing mat in accordance with claim 10 in which said spacings between adjacent projections in perpendicular directions are the same.

25. A weighing mat in accordance with claim 10 in which said spacings between adjacent projections in perpendicular directions are different.

26. A weighing mat in accordance with claim 12 in which said spacings between adjacent projections in perpendicular directions are the same.

27. A weighing mat in accordance with claim 12 in which said spacings between adjacent projections in perpendicular directions are different.

* * * * *